(No Model.) 2 Sheets—Sheet 1.

E. B. BLACKWELL.
Starching Machine.

No. 231,528. Patented Aug. 24, 1880.

WITNESSES
H. Lampy
R. J. Naylor

INVENTOR
Ezra B. Blackwell
By his attorney
J. L. Newton.

(No Model.) 2 Sheets—Sheet 2.

E. B. BLACKWELL.
Starching Machine.

No. 231,528. Patented Aug. 24, 1880.

UNITED STATES PATENT OFFICE.

EZRA B. BLACKWELL, OF NEWTON, MASSACHUSETTS.

STARCHING-MACHINE.

SPECIFICATION forming part of Letters Patent No. 231,528, dated August 24, 1880.

Application filed June 10, 1880. (No model.)

*To all whom it may concern:*

Be it known that I, EZRA B. BLACKWELL, of Newton, in the county of Middlesex and State of Massachusetts, have invented a new and useful Starching-Machine, of which the following is a specification.

My invention relates to improvements in starching-machines, in which I make use of corrugated rollers driven by gearing, and between said rollers and band-rollers I place an endless carrier, which takes up the starch from a pan placed under said rollers and carries up the same over one of the band-rollers and in between the corrugated rollers, upon which carrier the articles to be starched are placed, and are taken by said carrier between the corrugated rollers, where, by pressure of the rollers and the carrier, the articles to be starched become thoroughly saturated with starch, and are then carried by said carrier between the other band-roller and a pressure-roller, by which the superfluous starch is pressed out, and the articles, as they pass out from between said rollers, are taken up and folded. Of course I make use of gears and other mechanism, which will be described, to accomplish the above purpose.

To explain the mechanism and the operation of my machine, I refer to the accompanying drawings, which are made a part of this specification, wherein—

Figure 1:
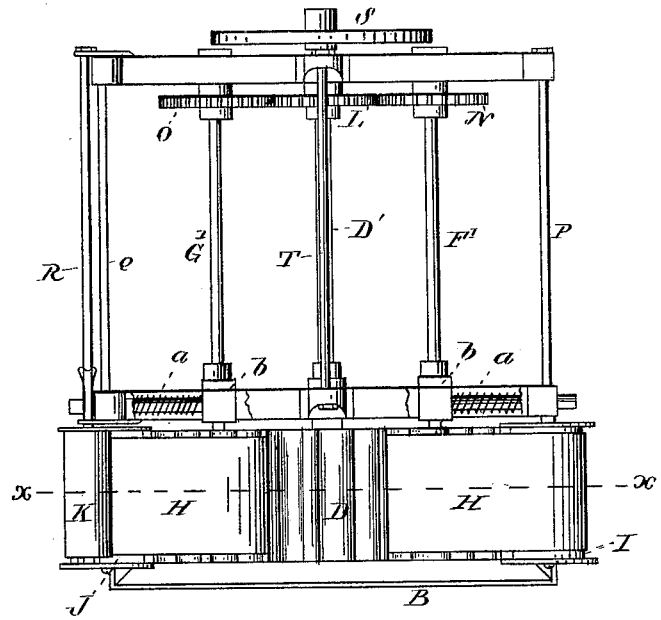
Figure 2:
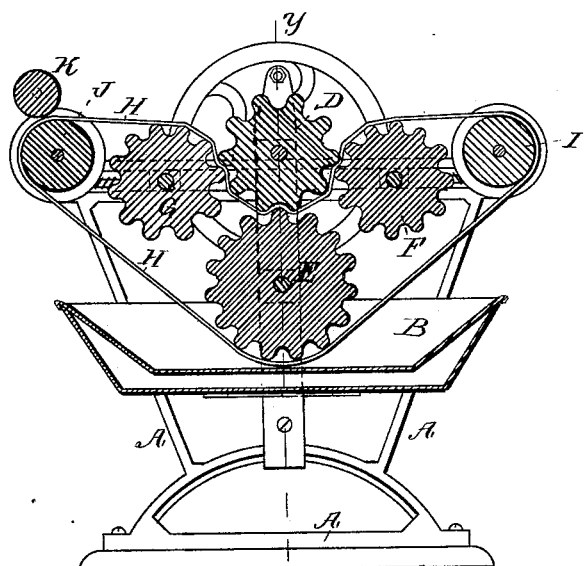
Figure 3:
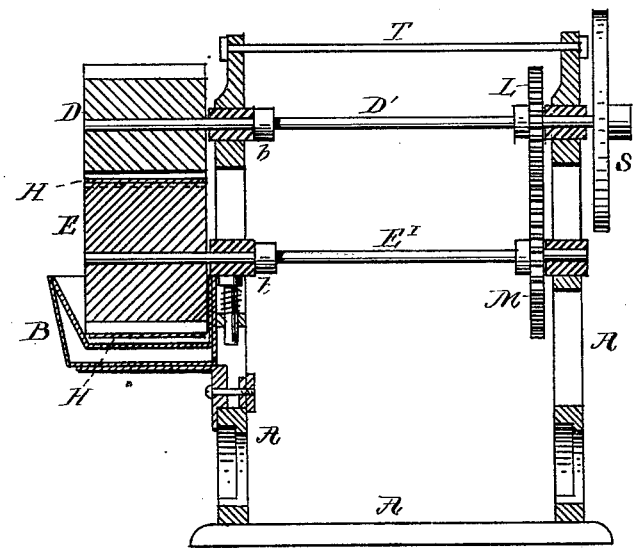

Figure 1 is a plan of the machine. Fig. 2 is a cross vertical section of Fig. 1 in line $x\,x$. Fig. 3 is a vertical section of Fig. 2, taken lengthwise in line $y\,y$.

The letter A represents the frame of the machine; B, a steam pan or holder of the starch to be used; D, the driving corrugated roller; E, the bottom corrugated roller, set partly into the pan containing the starch; F and G, corrugated rollers on either side of the driving-roller, their cogs meshing into and being driven by the driving-roller; H, the starch-carrier, which passes between the said corrugated rollers and over the band-rollers I and J, and under the bottom roller, E, as an endless band.

K is a pressure-roller; L, the driving-gear, which drives the bottom roller, E, by the shaft E′; N, gear which drives the roller F by the shaft F′; O, gear driving the roller G by the shaft G′; P, shaft of the band-roller I; Q, the shaft of the pressure-roller K; S, the driving-wheel, operated either by hand or by power; T, a brace which connects the top of the frame together.

$a\,a\,a$ are springs, which keep the corrugated rollers E, F, and G close up to the driving-roller D, said springs allowing room for material to pass through between said rollers.

$b\,b\,b$ are bearings, movable in the frame A, through which pass the shafts E′, F′, and G′, upon which shafts, outside the frame A, are the corrugated rollers.

The pan B, as shown in Fig. 2, has two apartments. The starch prepared for use is placed in the outside or open apartment, while in the inner apartment steam is introduced to keep the starch warm. Instead of steam a lamp may be placed under the pan. The carrier H, which is a broad band made of cloth or any suitable material, runs through the pan under the lower roller, E, and takes up the starch over the band-roller I, (see Fig. 2,) upon which carrier, when it has passed over said roller I, the articles to be starched are placed, and are taken by said carrier over the roller F and between the rollers F, D, E, and G, and then are passed out between the band-roller J and the pressure-roller K. By passing through or between said corrugated rollers the articles to be starched become thoroughly saturated with starch, and being carried between the said band and pressure rollers, the superfluous starch is pressed or squeezed out, and the articles are then taken and folded for ironing.

The corrugated rollers are made of wood or any suitable material. The carrier surrounds all the rollers except the driving-roller, and motion communicated to the driving-roller by means of its gear L, through its shaft D′, sets in motion all the other rollers and the carrier. The gears L N O are seen in Figs. 1 and 3. The gears L and M are seen in Fig. 3, and their shafts are seen in said Figs. 1 and 3.

Plain rollers and elastic corrugated rollers have been used in starching-machines, and are therefore new only in their combinations with other devices.

A labor-saving machine for starching articles of clothing in laundries is a great consideration. This machine accomplishes that end more completely than any other machine hitherto invented. The object of my invention is therefore plainly indicated.

What I claim as my invention, and desire to secure by Letters Patent, is—

1. In a starching-machine, A, the combination of the corrugated rollers D, E, F, and G and their shafts D', E', F', and G' with the gear L, M, N, and O, the band-rollers I and J, with their shafts P and Q, the pressure-roller K and its shaft R, and the endless carrier H, substantially as shown, and for the purpose described.

2. In a starching-machine, A, the combination of the pan B, the carrier H, the corrugated rollers D, E, F, and G, and the described mechanism for operating the same, substantially in the manner and for the purpose described.

EZRA B. BLACKWELL.

Witnesses:
EDWARD F. PORTER,
J. L. NEWTON.